Patented Apr. 2, 1946

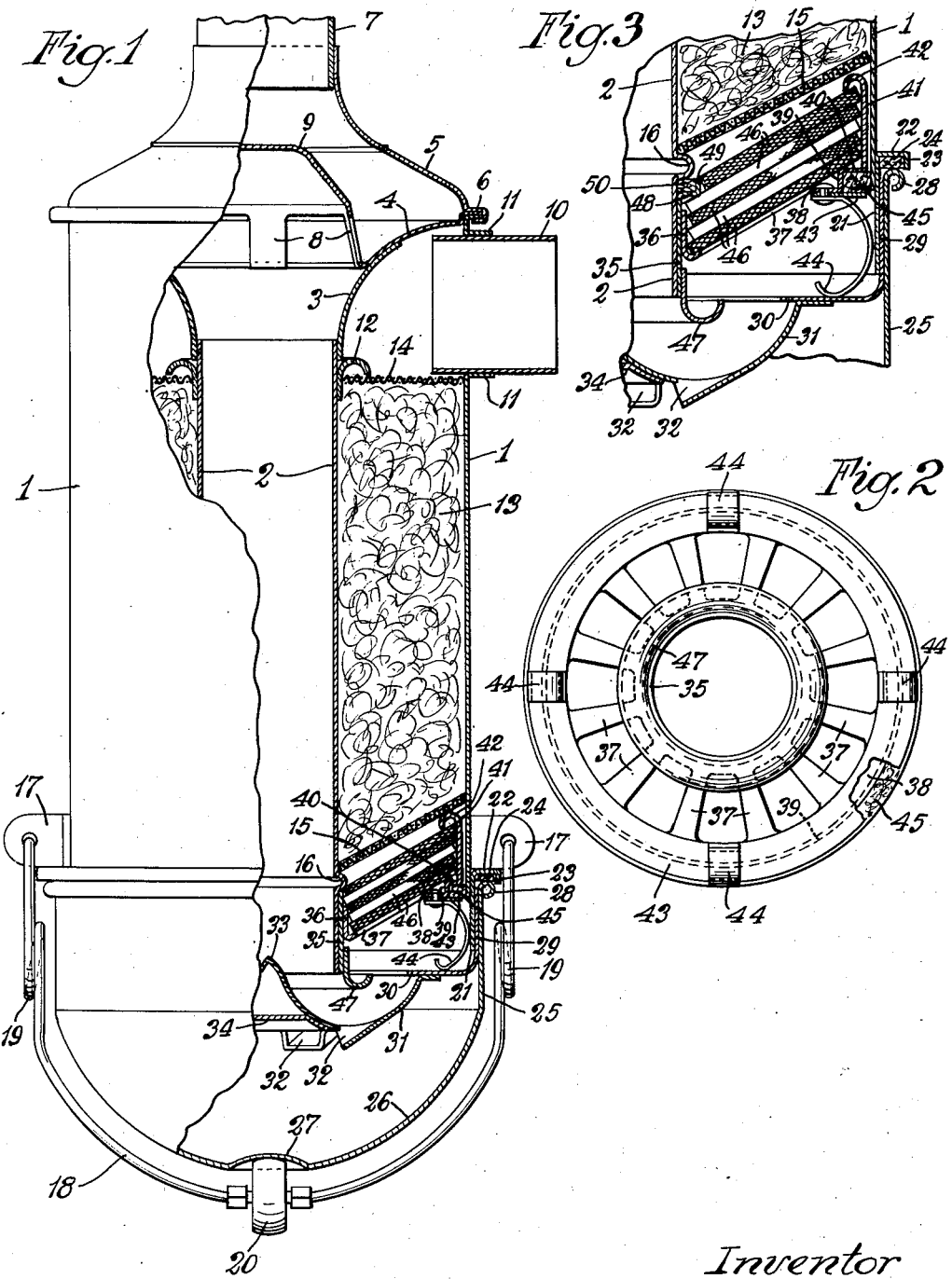

2,397,525

UNITED STATES PATENT OFFICE 2,397,525

CLEANER CONSTRUCTION

Dale L. Bennett, Flossmoor, Ill., assignor to United Specialties Company, Chicago, Ill., a corporation of Delaware Application March 25, 1943, Serial No. 480,457

5 Claims. (Cl. 183—15)

The invention relates to an air cleaner of the type which may be used to remove impurities from air or gaseous materials and which has for one object to provide in such a mechanism convenient means for cleaning or filtering the fluid which passes through the cleaner and to provide ready means for removal and cleaning of some at least of the filtering means.

Another object is therefore to provide a filter unit which may be readily removed and readily replaced.

Another object is to provide readily assembled means for holding the filtering means in position.

A still further object is to provide packing or gasket means arranged to prevent movement of air along an incorrect path through the cleaner.

A further object is to provide in connection with a removable filter unit leak preventing means which are effective to permit the relatively loose fit of the filter unit and at the same time to prevent unsatisfactory or improper fluid flow through the system.

Other objects will appear from time to time throughout the specification and claims.

The invention is illustrated more or less diagrammatically in the accompanying drawing, wherein:

Figure 1 is a side elevation of one form of the device with parts broken away and parts in section.

Figure 2 is a bottom plan view with the cup removed and with parts broken away.

Figure 3 is a fragmentary sectional view taken on an enlarged scale showing a modified form of sealing means.

Like parts are indicated by like characters throughout the specification and drawing.

While the particular structural features of the present invention may be embodied in many different forms of air cleaners or filtering means, for purposes of illustration they are shown herewith in connection with one particular type of cleaner, although their use is not essentially limited to association with that cleaner.

As shown the cleaner comprises an outer housing 1 which is generally cylindrical. Within this housing is positioned an inlet passage member 2 which at its upper end is secured to a funnel-like member 3. This member is secured to a continuing funnel-like member 4 which at its upper edge is secured to the housing member 1. A cover member 5 is crimped as at 6 about the upper edges of the members 1 and 4. The member 5 may have secured to it an inlet connection 7. The funnel-like member 4 is provided preferably with pairs of upwardly extending members 8 which join together to form an upwardly extending dome-like member 9. On one side the housing 1 may be perforated to provide an opening for an outlet connection member 10, and if desired a flange 11 may be formed about the opening in which the member 10 is received.

Positioned on the outer surface of the member 2 is a downwardly directed baffle member 12.

Within the annular space defined by the members 1 and 2 a quantity of filter material 13 is positioned. This material may be metallic wool or any other desirable filter medium. A disk or cover member 14 is positioned upon the top of the filter material 13 and is preferably in contact with the baffle 12 and with the outlet connection member 10. It may be formed of woven metallic fabric or of perforated material, and its purpose is to prevent upper displacement of the filter material 13 or of particles of that material. A conical disk 15 is positioned at the bottom of the mass of filter material 13. It is preferably similar in construction and material to the disk 14 and serves a similar purpose.

The member 2 is preferably provided with an outwardly extending bead or shoulder 16 against which the inner edge of the member 15 is supported.

Upon its outside the housing 1 is provided with a pair of ears 17, 17 which are perforated to receive the ends of a bail 18. The bale may be shaped to provide springs 19 and may carry a roller 20. Secured to the member 1 adjacent its lower end is a ring-like or cylindrical member 21. This member may be spot-welded or otherwise fastened to the housing 1. It is provided with a laterally extending flange 22 which terminates in a downwardly extending flange 23. Packing or sealing material 24 is positioned between the members 21, 22, and 23.

A cup 25 may include a cylindrical portion as shown and a concave portion 26 which may have a depression 27 to engage the roller 20. At its upper edge the cup may have a bead or shoulder 28 which bears against the packing or sealing material 24 when the cup is in position on the cleaner as shown in Figures 1 and 3.

Secured to the cup and positioned within it is a baffle assembly which includes a portion 29 which has a baffle portion 30. To this is secured a rounded baffle member 31 having a plurality of openings 32, 32 and a central relatively conical portion 33. On its under side the conical portion 33 may be closed by a plate 34. The baffle assembly is preferably secured by welding but may be secured thereto by other means.

The removable filter unit or assembly includes the following parts: a ring-like member 35 of such size that it slips over the lower end of the member 2 and fits it with a relatively close friction fit. When it is in place the form shown in Figure 1, the upper end of the member 35 abuts against the bead or shoulder 16 formed in the member 2. Secured to the ring 35 is a spider which comprises a ring-like member 36 and a plurality of spokes or radial members 37. At their outer ends the spokes 37 are secured to or formed integrally with a ring-like member 38 which is shaped as at 39 to provide an upwardly extending shoulder. The member 39 is joined to a portion 40 angularly disposed with respect to it. Joined to the member 40 is an upwardly extending ring-like member 41 which is provided with a downwardly curved portion 42. This portion may serve as a fluid baffle and also holds in place the filter members.

Secured to the portion 38 is a flat annular member 43. These parts may be secured together by rivets as shown in Figure 1 or otherwise and a plurality of downwardly and inwardly curved springs 44 may be secured in place between rivets as shown. The springs 44 are of such size and shape that when the parts are in the assembled position, the springs are under compression and the removable filter assembly is held in position, and rattling or displacement is prevented.

A packing or sealing 45 is positioned between the members 39, 40 and 43 and is of such shape that it forms a sealing or wiping fit with the inner surface of the housing section 1.

Positioned between the members 36 and 41 is a plurality of relatively conical screen sections 46, 46. As shown there are five such screen sections. They may be of woven metallic fabric or may be of other material, and they are of such nature that they permit the passage of oil or other filtering fluid and at the same time furnish a labyrinth passage for the gaseous fluid from which impurities are to be removed.

Secured to the ring-like member 35 is an upwardly facing curved baffle 47. The removable screen assembly or unit thus comprises the members 35 and 36, together with the member 41, the spokes 37, the screen sections 46, the baffle 47, the packing 45, and the associated parts.

In the modified form of Figure 3 the ring 35 is provided adjacent its upper end with a laterally bent portion 48 and an upwardly extending portion 49. A packing or sealing member 50 is positioned between the members 48 and 49 and, when the parts are in assembled position, it abuts against the bead or shoulder 16, thus additionally sealing the filter element against fluid leakage at this point.

Although there is shown an operative form of the device, it will be understood that many changes in the form, shape and arrangement of parts might be made without departing from the spirit of this invention, and it is wished that the showing be taken as, in a sense, diagrammatic.

The use and operation of this invention are as follows:

As shown the parts are in the assembled position, and oil or other filtering fluid is positioned in the cup. Ordinarily the fluid will extend approximately to or slightly above the upper edge of the baffles 30 and 47. The device will ordinarily be connected to an engine to clean and filter the air which is drawn into the engine, although it is not at all limited to that particular use. Assuming that it is connected to an engine and that oil is present in the cup, when the engine is started air is drawn downwardly through the pipe 2, passes about and between various baffles in the cup and passes thence upwardly through the removable filter section and through the fixed filter section 13 and after that through the connection 10. When this occurs a certain amount of oil or other filtering fluid is carried upwardly into the filter mass and impurities coming in contact with the oil are removed from the moving current of air or gas so that cleaned air passes through the system. When the engine is stopped, the movement of air through the cleaner stops, and the cleaning fluid flows downwardly into the cup again, carrying with it the impurities or a large part of them.

Some return flow of the cleaning fluid occurs, of course, during the operation of the engine as well.

As impurities accumulate in the cleaning fluid, it is necessary to change the cleaning fluid and it is desirable to clean and remove a portion of the filter mass. This cleaning is accomplished as follows: The bail 18 is swung to the side and the cup is removed. The cleaning fluid may be thrown away and new fluid put into the cup.

With the cup as it is removed, the baffle assembly including the members 30, 31 and attached parts is also removed, since they are secured to the cup. When that occurs, the springs 44 are no longer under compression and the removable screen unit is then free to be pulled downwardly from between the housing members 1 and 2, and this removable assembly may be cleaned in any manner desired by washing or otherwise. After it has been cleaned, it is replaced, the cup with clean fluid in it is replaced, the bail is moved into position again, the roller 26 is engaged in the depression 27, and the parts are again in position for use. Ordinarily the cleaner is supported in some manner adjacent its point of use and it need not be removed for cleaning. It is only necessary to remove the cup and the removable filter unit.

I claim:

1. In combination, in an air cleaner, a generally vertical down draft tube, a generally cylindrical outer housing generally concentric with the tube and spaced radially outwardly therefrom, the tube and housing defining between them a filter space, a bottom cup removably secured to said outer housing, an annular baffle unitary with the cup, adapted to direct air from the tube upwardly into the lower end of said filter space, said baffle being spaced upwardly above the bottom of the cup, and being apertured to permit an induction of a cleaning liquid upwardly from the interior of the cup to said filter space, a filter mass in the upper portion of said filter space, and an annular removable preliminary filter assembly positioned in the lower portion of said filter space, abutment means for limiting upward movement of said assembly in said space, and a resilient thrust member between said cup and said filter assembly, adapted to hold said preliminary filter assembly firmly in position when the cup is secured to the outer housing.

2. In combination, in an air cleaner, a generally vertical down draft tube, a generally cylindrical outer housing generally concentric with the tube and spaced radially outwardly therefrom, the tube and housing defining between them a filter space, a bottom cup removably secured to said outer housing, an annular baffle unitary with the cup, adapted to direct air from the tube upwardly into the lower end of said filter space, said baffle being spaced upwardly above the bottom of the cup, and being apertured to permit an induction of a cleaning liquid upwardly from the interior of the cup to said filter space, a filter mass in the upper portion of said filter space, and an annular removable preliminary filter assembly positioned in the lower portion of said filter space, abutment means for limiting upward movement of said assembly in said space, and a resilient thrust member between said cup and said filter assembly, adapted to hold said preliminary filter assembly firmly in position when the cup is secured to the outer housing, said preliminary filter assembly including a plurality of separate superposed annular screen sections and inner outer centering flanges therefor.

3. In combination, in an air cleaner, a generally vertical down draft tube, a generally cylindrical outer housing generally concentric with the tube and spaced radially outwardly therefrom, the tube and housing defining between them a filter space, a bottom cup removably secured to said outer housing, an annular baffle unitary with the cup, adapted to direct air from the tube upwardly into the lower end of said filter space, said baffle being spaced upwardly above the bottom of the cup, and being apertured to permit an induction of a cleaning liquid upwardly from the interior of the cup to said filter space, a filter mass in the upper portion of said filter space, and an annular removable preliminary filter assembly positioned in the lower portion of said filter space, abutment means for limiting upward movement of said assembly in said space, and a resilient thrust member between said cup and said filter assembly, adapted to hold said preliminary filter assembly firmly in position when the cup is secured to the outer housing, said preliminary filter assembly including an outer annulus and a packing, secured thereto, adapted to oppose the inner face of the outer housing.

4. In combination, in an air cleaner, a generally vertical down draft tube, a generally cylindrical outer housing generally concentric with the tube and spaced radially outwardly therefrom, the tube and housing defining between them a filter space, a bottom cup removably secured to said outer housing, an annular baffle unitary with the cup, adapted to direct air from the tube upwardly into the lower end of said filter space, said baffle being spaced upwardly above the bottom of the cup, and being apertured to permit an induction of a cleaning liquid upwardly from the interior of the cup to said filter space, a filter mass in the upper portion of said filter space, abutment means for limiting upward movement of said filter mass in said filter space, including an outwardly projecting and downwardly recurved flange element on said tube, adapted to prevent the passage of the cleaning liquid upwardly along said tube, and an annular removable preliminary filter assembly positioned in the lower portion of said filter space, abutment means for limiting upward movement of said assembly in said space, and a resilient thrust member between said cup and said filter assembly, adapted to hold said preliminary filter assembly firmly in position when the cup is secured to the outer housing.

5. In combination, in an air cleaner, a generally vertical down draft tube, a generally cylindrical outer housing generally concentric with the tube and spaced radially outwardly therefrom, the tube and housing defining between them a filter space, a bottom cup removably secured to said outer housing, an annular baffle unitary with the cup, adapted to direct air from the tube upwardly into the lower end of said filter space, said baffle being spaced upwardly above the bottom of the cup, and being apertured to permit an induction of a cleaning liquid upwardly from the interior of the cup to said filter space, a filter mass in the upper portion of said filter space, and an annular removable preliminary filter assembly positioned in the lower portion of said filter space, abutment means for limiting upward movement of said assembly in said space and adapted also to limit the downward movement of said filter mass, and a resilient thrust member between said cup and said filter assembly, adapted to hold said preliminary filter assembly firmly in position when the cup is secured to the outer housing.

DALE L. BENNETT.